April 25, 1950  H. C. KIME ET AL  2,505,250
TRANSPARENT SLIDE MOUNT
Filed June 18, 1945
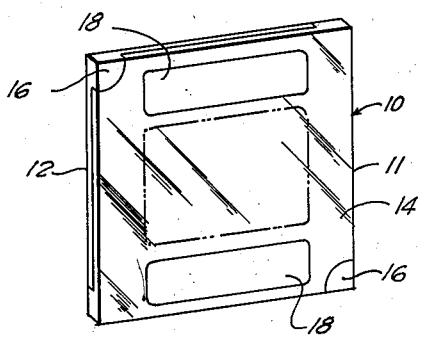
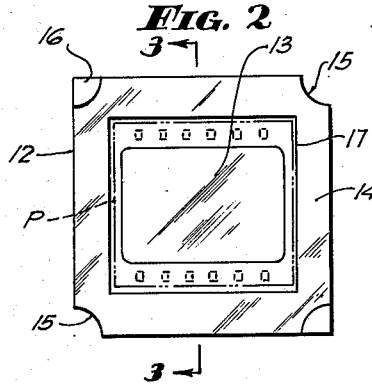 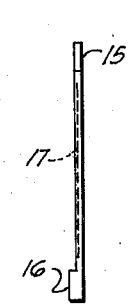 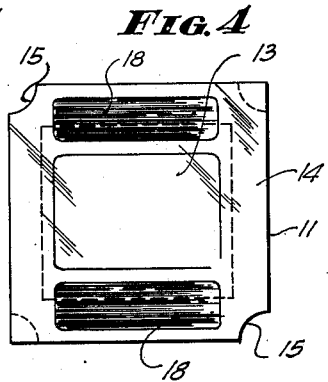
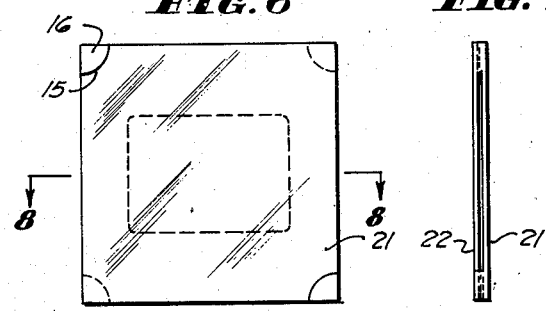 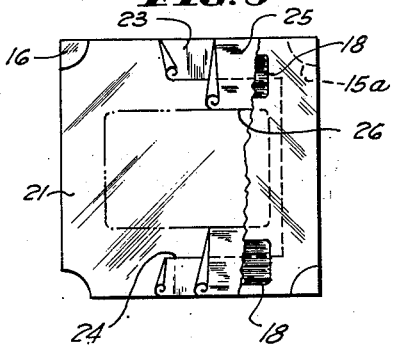
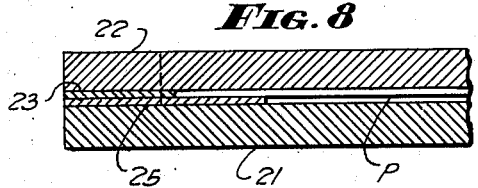
INVENTOR.
*Harold C. Kime*
*Lucille C. Kime*
BY
*C. Lauren Maltby*
ATTORNEY Patented Apr. 25, 1950

2,505,250

UNITED STATES PATENT OFFICE 2,505,250

TRANSPARENT SLIDE MOUNT

Harold C. Kime and Lucille C. Kime, Altadena, Calif.

Application June 18, 1945, Serial No. 600,086

5 Claims. (Cl. 40—152)

This invention relates to photographic apparatus, and more especially to a slide construction for mounting film prints.

An object of the invention is to provide a simple, practical and inexpensive slide construction for mounting photographic prints.

Another object of the invention is to provide a novel slide construction adapted for quick mounting of film prints, which mounting has features by which the slide may be dissembled for removing and replacing the prints so that the same slide may be used repeatedly with different prints.

A further object of the invention is to provide a novel slide construction having essentially two principal elements having inter-engaging features for co-attachment, whereby the slide assembly may be quickly effected and readily dissembled for replacing prints therein.

An additional object is to provide a novel slide construction comprising substantially two flat, identical plate members having transparent center portions formed with grooves for securing a print therein.

Another object is to provide a slide construction formed of a pair of transparent plates having self-contained features for co-attachment, whereby a film print may be secured therebetween and centered by the use of an opaque frame.

A further object is to provide a novel slide construction formed essentially of a pair of transparent plates or plates having a transparent center portion having frame or border surface portions which may be roughened or sanded, whereby an inscription or other designation may be written on this surface portion.

Other objects and advantages will appear and be brought out more fully in the following specification, reference being had to the accompanying drawings, wherein:

Fig. 1 is a perspective view of a slide assembly showing an embodiment of our invention.

Fig. 2 is an inner face view of one of the plate elements shown in Fig. 1.

Fig. 3 is a cross section view taken along the line 3—3 of Fig. 2.

Fig. 4 is an outer face view of the complementary plate member also shown in Fig. 1.

Fig. 5 is a side elevation view of the plate member shown in Fig. 4.

Fig. 6 is a face view of a slide assembly incorporating modified features of our invention.

Fig. 7 is an end view of the assembly shown in Fig. 6.

Fig. 8 is an enlarged, partial, sectional, view taken along the line 8—8 of Fig. 6.

Fig. 9 is a view similar to Fig. 6, partly broken away, showing the detailed construction of this modification.

This invention is concerned with the mounting of film prints made up as slides, the prints being of miniature size and of the familiar type. The print consists of a section cut from a strip of film, and when mounted in a frame or slide can be viewed in front of a diffused light, or the slide may be projected on a screen. Slides, as heretofore constructed, customarily comprise a pair of glass plates between which the film strip is placed, the plates being secured together in a frame which may be metal or paperboard, the paperboard type requiring a gummed paper sealing frame or border portions.

These types of slide construction are often necessarily thick and may have irregular surface portions because of the necessity of covering the edges of the glass plates with a sealing strip, and in any event these types of slides do not have practical features by which the parts may be dissembled and the frames used repeatedly. It is therefore the general object and purpose of our present invention to provide a slide frame construction and assembly in which the objectionable features of slides, as now known and used, are overcome.

Referring more particularly to the drawing, we show a slide assembly or unit 10 which comprises a pair of rectangular or square plates 11 and 12, plates 11 and 12 being substantially identical in shape and construction, however, they are separately identified herein, plate 11 being considered the front plate, and plate 12 the rear plate. Plates 11 and 12 are preferably formed of a plastic material and may be transparent throughout or have a transparent central portion 13 and side portions 14 which may be colored so as to be opaque, whereby to prevent light transmission except through the center portion 13.

Plates 11 and 12 have a pair of opposite corners notched at 15, and the alternate opposite corners are provided with bosses 16 which are formed to interfit in the notches 15 of each complementary plate member, the fit being sufficiently tight to hold the pair of plates together during ordinary handling but being adapted for separation by prying apart, as should be obvious. Plates 11 and 12 are each shown as provided with a central surface recess 17 in the inner surface thereof, this recess being sufficient to receive and centrally position a film print P which is cut to rectangular form of substantially the size of recess 17.

The slide unit 10 is assembled by merely placing a print P in the recess 17 of one of the plates, and placing the other plate thereon, and pressing the two plates together. The slide is thereupon complete, and whenever it is desired to replace or remove print P the plates 11 and 12 may be readily pried apart, and the print P removed and replaced by another print. It will be clear that only one of the plates 11 or 12 need be provided with a recess 17, however, for uniformity of manufacture it may be more economical to provide both plates with this recess. It is often desirable to write an inscription or designation on the slide assembly, and for this purpose a portion 18 of the border 14 may be roughened or sanded to permit writing such matter thereon. It will also be clear that the border portion 14 of only one of the plates need be opaque, as this will be sufficient to prevent light transmittal through the border when viewing the picture or print on a viewing rack or when projected from a lantern.

In Figs. 6 to 9 we show a modified form of the invention which comprises a pair of plates 21 and 22, substantially similar to plates 11 and 12 in outline, and means of co-attachment 15 and 16, however, plates 21 and 22 are of transparent material throughout and are not provided with the central recess 17. In the present form of our invention we provide a centering frame 23 of paperboard or the like, having the rectangular outline of plates 21 and 22 and the corners notched at 15a so as to be centered by bosses 16, and further provided with a framing aperture 24 which will serve to center a film print P when placed therein. A masking frame 25 is provided or may be formed integrally with centering frame 23, and is formed with a central rectangular opening 26 for the transmission of light through the print P. The slide of Figs. 6 to 9 is assembled in a manner similar to that of Figs. 1 to 5, as should be clear to those skilled in the art.

The foregoing description is illustrative, rather than restrictive of our invention, it being understood that changes and modifications may be made without departing from the spirit and scope of the sub-joined claims. For instance, the notches and bosses 15 and 16, while shown at the corners of the plate members, it may be found to be more expedient or practical to place them along the edges, and spaced from the corners.

Sanded portions 18 may be duplicated at the top or bottom or at the sides, as may be desired, or the entire border portion 14 may be sanded and thus provide the necessary opaqueness without necessitating coloring the side portions, and slides made in this manner will not require any paper opaque framing insert.

It may be further desirable, due to manufacturing expediency or the type of prints desired to be mounted, that the recesses 17 be circular, oval or have such other shape as may be preferred. Such changes and modifications are contemplated in our invention, it being understood that transparencies of any size, shape and material may be mounted in the disclosed construction. When the masking frame 25 is used it may be practical to provide thereon an inscription or other identifying data, and the sanded portions 18 may in such cases be eliminated.

Having thus described our invention, what we claim and desire to secure by Letters Patent is:

1. A slide mount comprising, in combination, a pair of substantially identical rectangular flat plates each having a plurality of marginal notches and marginal bosses on a surface thereof substantially equal in height to the thickness of the plate, the notches and bosses of the respective plates being of a form providing interfitting frictional engagement upon the plates being brought together in face to face relation in a manner to align the marginal edges of the plates.

2. A slide mount comprising, in combination, a pair of substantially identical rectangular flat plates each having a plurality of marginal notches and marginal bosses on a surface thereof substantially equal in height to the thickness of the plate, the notches and bosses of the respective plates being of such form as to be adapted in pairs for interfitting frictional engagement upon the plates being brought together in face to face relation in a manner to align the marginal edges of the plates, the notches of each plate being disposed at opposite positions and the bosses being disposed likewise.

3. A slide mount comprising, in combination, a pair of substantially identical rectangular flat plates each having a plurality of marginal notches and marginal bosses on a surface thereof substantially equal in height to the thickness of the plate, the notches and bosses of the respective plates being of such form as to be adapted in pairs for interfitting frictional engagement upon the plates being brought together in face to face relation in a manner to align the marginal edges of the plates, the notches of each plate being disposed at opposite corners thereof and the bosses of each plate being disposed at the alternate opposite corners thereof.

4. A slide mount comprising, in combination, a pair of substantially identical rectangular flat plates each having a marginal notch and a marginal boss on a surface thereof, the notches and bosses of the respective plates being parti-circular and so disposed as to provide interfitting frictional engagement with the marginal edges of the plates in alignment upon the plates being brought together pressurally in face to face relation and means to secure a film print between said plates.

5. A slide mount comprising, in combination, a pair of substantially identical rectangular flat plates each having a marginal notch and a marginal boss on a surface thereof, the notches and bosses of the respective plates being parti-circular and so disposed as to provide interfitting frictional engagement upon the plates being brought together in face to face relation with the marginal edges of the plates in alignment and means to secure a film print between said plates, said means including a centering frame having marginal notches aligned with the notches of said plates of a form to interfit with the bosses of said plates.

HAROLD C. KIME.
LUCILLE C. KIME.

REFERENCES CITED

The following references are of record in the file of this patent:

UNITED STATES PATENTS

| Number | Name | Date |
|---|---|---|
| 1,524,797 | Mayer | Feb. 3, 1925 |
| 1,738,054 | Hill | Dec. 3, 1929 |
| 1,932,464 | Hyde | Oct. 31, 1933 |
| 2,088,944 | Young et al. | Aug. 3, 1937 |
| 2,120,673 | Meadows | June 14, 1938 |
| 2,164,655 | Kleerup | July 4, 1939 |
| 2,176,283 | Whiteford | Oct. 17, 1939 |
| 2,292,312 | Wittel et al. | Aug. 4, 1942 |
| 2,359,659 | Margulies | Oct. 3, 1944 |